US005794321A

United States Patent [19]

Jereb

[11] Patent Number: 5,794,321

[45] Date of Patent: Aug. 18, 1998

[54] SPRING COMPRESSION TOOL AND METHOD

[76] Inventor: Eric A. Jereb, 14500 Reddington Ave., Maple Heights, Ohio 44137

[21] Appl. No.: 690,641

[22] Filed: Jul. 30, 1996

[51] Int. Cl.[6] .......... B23P 19/04

[52] U.S. Cl. .......... 29/225; 29/227; 29/257; 29/281.5; 269/249

[58] Field of Search .......... 29/225, 227, 257, 29/281.5; 269/249

[56] References Cited

U.S. PATENT DOCUMENTS

| | | | |
|---|---|---|---|
| 1,497,107 | 6/1924 | Lasell | 29/249 |
| 2,627,113 | 2/1953 | Moray | 269/249 |
| 2,698,550 | 1/1955 | Hill | 269/249 |
| 3,355,791 | 12/1967 | Castoe | 29/227 |
| 4,962,918 | 10/1990 | Yang | 269/249 |
| 4,977,660 | 12/1990 | Maynard | 29/257 |
| 5,210,919 | 5/1993 | Garman | 29/257 |

*Primary Examiner*—James F. Coan
*Assistant Examiner*—Gene L. Kim
*Attorney, Agent, or Firm*—Pearne, Gordon, McCoy & Granger LLP

[57] ABSTRACT

A spring compression tool and method for using the spring compression tool in assembling a brake shoe adjustment mechanism on a WAGNER front brake. The tool includes a C-shaped body member and an adjustable portion. The body member includes a first end having a first clamping member, and a second end to which the adjustable portion is movably mounted. The adjustable portion includes a threaded shaft and a beam member. The beam member includes a plate and second and third clamping members. Rotation of the shaft moves the second and third clamping members relatively toward or away from the first clamping member. The tool is used to compress a brake shoe adjustment spring, and to maintain the spring in a compressed condition to permit assembly of other components of the adjustment mechanism.

11 Claims, 4 Drawing Sheets

SPRING COMPRESSION TOOL AND METHOD

BACKGROUND OF THE INVENTION

Large shoe brake systems generally include means for manual or automatic adjustment of the brake shoes radially toward the surrounding drum. Adjustment is necessary as the brake linings wear to maintain the brake lining a predetermined distance from the surrounding brake drum. In large brakes, such as is commonly used on trucks, a large spring is used to maintain the brake shoes the preset distance from the surrounding drum following adjustment. The spring is a component of the manual or automatic brake shoe adjustment system. Although such adjustment systems work quite well, they are difficult to replace, as is necessary periodically.

Typically, when the brake shoes and/or brake linings must be replaced, the manual or automatic adjustment system should also be removed and replaced. Replacement entails compression of the spring to reinstall a new adjustment system. However, compression of the spring prior to the present invention has been problematic and time consuming for both individual mechanics and for mechanics working in pairs. Several methods of spring compression have been employed, none of which have been entirely satisfactory. Due to the rigidity of the spring, a high degree of leverage has been necessary to compress the spring. However, due to the spring being but one component of a multi-piece assembly, maintaining the spring in a compressed condition to permit assembly of the remaining components has been difficult. Therefore, it has been common for mechanics to not replace the adjustment mechanism.

Therefore, there exists a need in the art for a spring compression tool and for a method of using a spring compression tool to compress the brake shoe adjustment system spring, and to maintain the spring in a compressed condition for subsequent assembly of the various other components of the manual and/or automatic brake shoe adjustment system.

SUMMARY OF THE INVENTION

The present invention is directed toward a spring compression tool and toward a method for using the spring compression tool to simplify and speed installation and assembly of manual or automatic brake shoe adjustment systems. The present invention is also directed toward a tool for compressing a brake shoe adjustment spring and for maintaining the brake shoe adjustment spring in a compressed condition for subsequent installation and assembly of the various other components of a brake shoe adjustment system. The present invention is further directed toward a method for compressing a brake shoe adjustment spring and for assembling a manual or automatic brake shoe adjustment system.

In accordance with the present invention, the spring compression tool includes a C-shaped body member and an adjustable portion. The body member includes first and second ends. The first end includes a first clamping member, while the second end has the adjustable portion movably secured thereto.

In further accordance with the present invention, the adjustable portion includes a beam member and a threaded shaft. The threaded shaft is threadably secured to the second end of the body member, and has a first end and a second end. The second end of the shaft has a handle member secured thereto. The beam member includes a plate from which second and third clamping members extend toward the first clamping member. The first end of the shaft is secured to the plate. Rotation of the shaft moves the second and third clamping members relatively toward or away from the first clamping member.

In further accordance with the present invention, the second and third clamping members are adjustably secured to the plate such that a spacing between the second and third clamping members may be varied.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
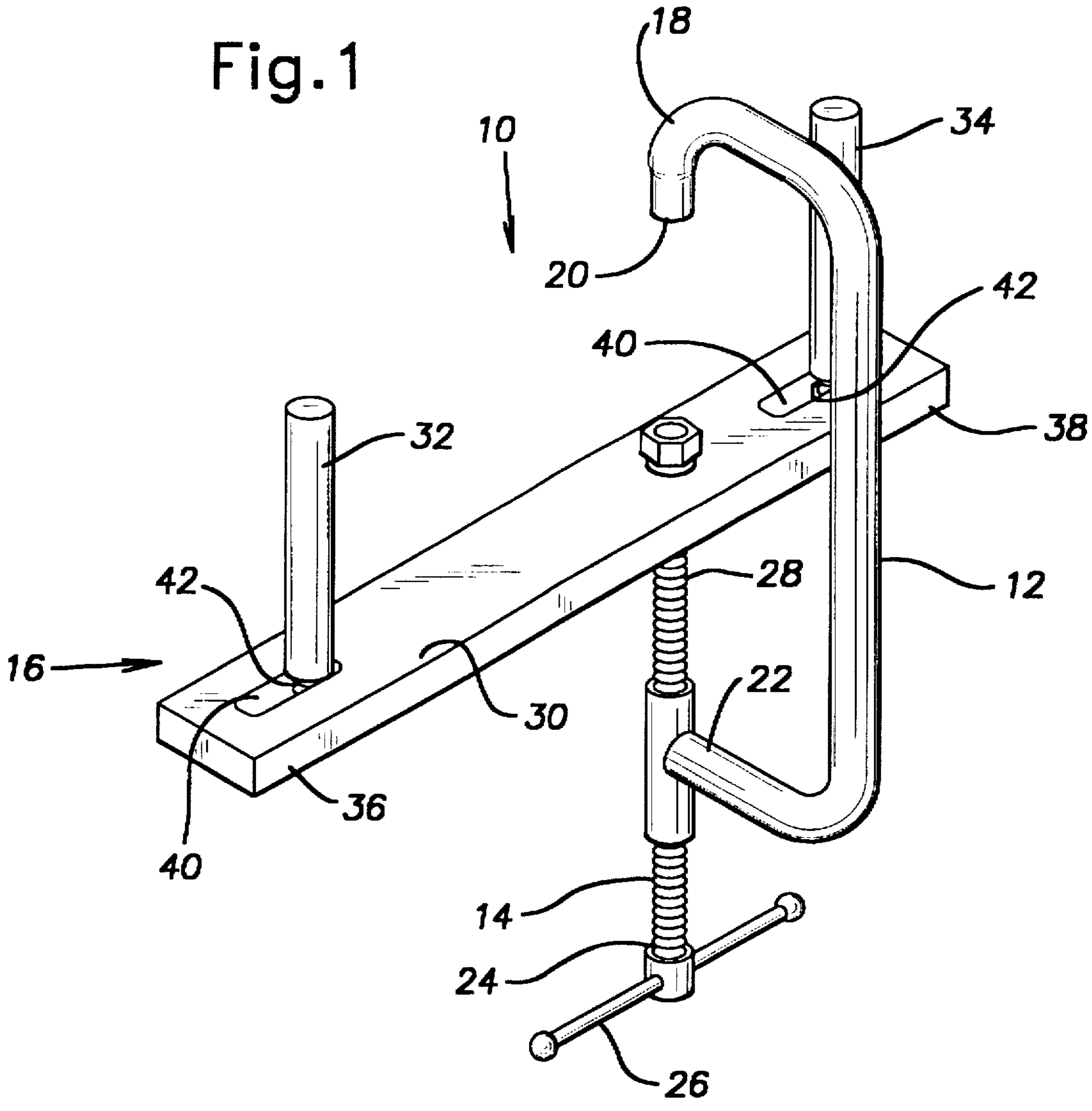
FIG. 1 is a perspective view of a brake assembly tool according to the present invention.
Figure 2:
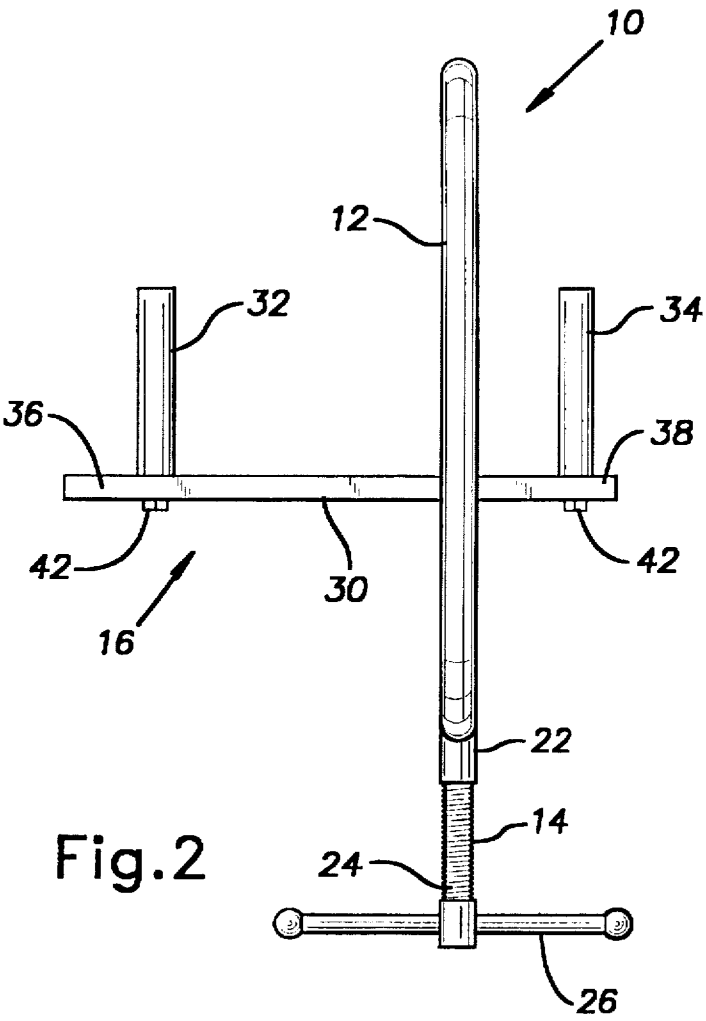
FIG. 2 is a front elevational view of the brake assembly tool shown in FIG. 1.
Figure 3:
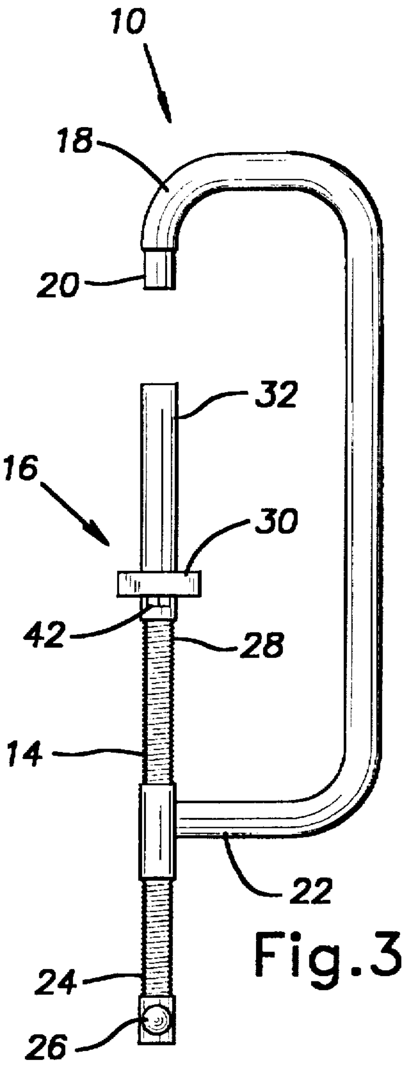
FIG. 3 is a side elevational view of the brake assembly tool shown in FIGS. 1 and 2.
Figure 4:
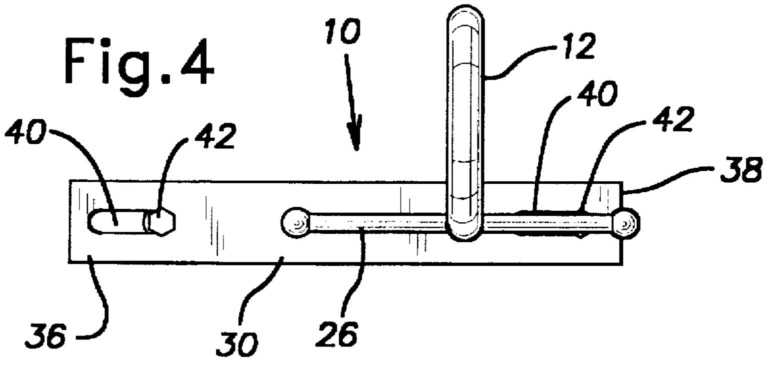
FIG. 4 is a top plan view of the brake assembly tool shown in FIGS. 1–3.

With reference to FIGS. 1–4, the tool 10 according to the present invention is illustrated. The tool 10 generally includes a C-shaped body member 12, a threaded shaft 14, and a beam member 16. The body member 12 is preferably circular in cross-section and is formed from solid bar-type stock. The shaft 14 and beam member 16 cooperate to define an adjustable portion of the tool 10. That C-shaped body member 12 has a first end 18 which includes a first clamping member 20, and a second end 22 which threadably receives the shaft 14. The first clamping member preferably includes a recess or bore, as illustrated. The first clamping member 20 faces toward the second end 22 of the body member, and is generally co-axial with the threaded shaft. The second end 22 of the body member 12 includes an internally threaded tubular portion which extends generally co-axial with the first clamping member 20 and threadably receives the shaft 14, as illustrated.

A first or lower end 24 of the shaft 14 has a handle member 26 secured thereto. A second or upper end 28 of the shaft 14 is secured to the beam member 16 such that the beam member 16 moves longitudinally with the shaft 14 between the first and second ends of the C-shaped body member 12 while the shaft rotates relative to the beam member. The beam member 16 preferably does not rotate with the shaft 14 for reasons which will be apparent to one skilled in the art.

The beam member 16 is disposed between the first and second ends 18, 22 of the C-shaped body member 12 and includes a generally planar plate 30 from which second and third clamping members 32, 34 project. The plate 30 has a first end 36 and a second end 38, and is secured to the shaft 14 relatively closer to the second end 38 than to the first end 36, as illustrated.

The second clamping member 32 is located adjacent the first end 36 of the plate 30, and the third clamping member is located relatively adjacent the second end 38 of the plate 30. Each of the second and third clamping members 32, 34 are generally circular in cross-section and are preferably formed from solid bar-type stock. The second and third clamping members are adjustably mounted to the plate 30 by means of a slot-and-bolt configuration wherein an elongated slot 40 is formed in the plate 30 and a bolt 42 is threaded into the second and third clamping members 32, 34, as shown best in FIGS. 1 and 3. By this arrangement, the second and third clamping members 32, 34 are movable to different relative spacings as may be necessary or desirable depending on the size of the brake shoe, as will be described hereinafter.

The second and third clamping members 32, 34 extend from the plate 30 toward the first clamping member 20, and are parallel to one another, and generally parallel to the first clamping member 20 and the threaded shaft 14. Rotation of the threaded shaft 14 via the handle member 26 moves the shaft 14 relative to the second end. 22 of the C-shaped body member 12, and causes the beam member 16 and, hence, the second and third clamping members 32, 34, to move toward or away from the first clamping member 20.

Figure 5:
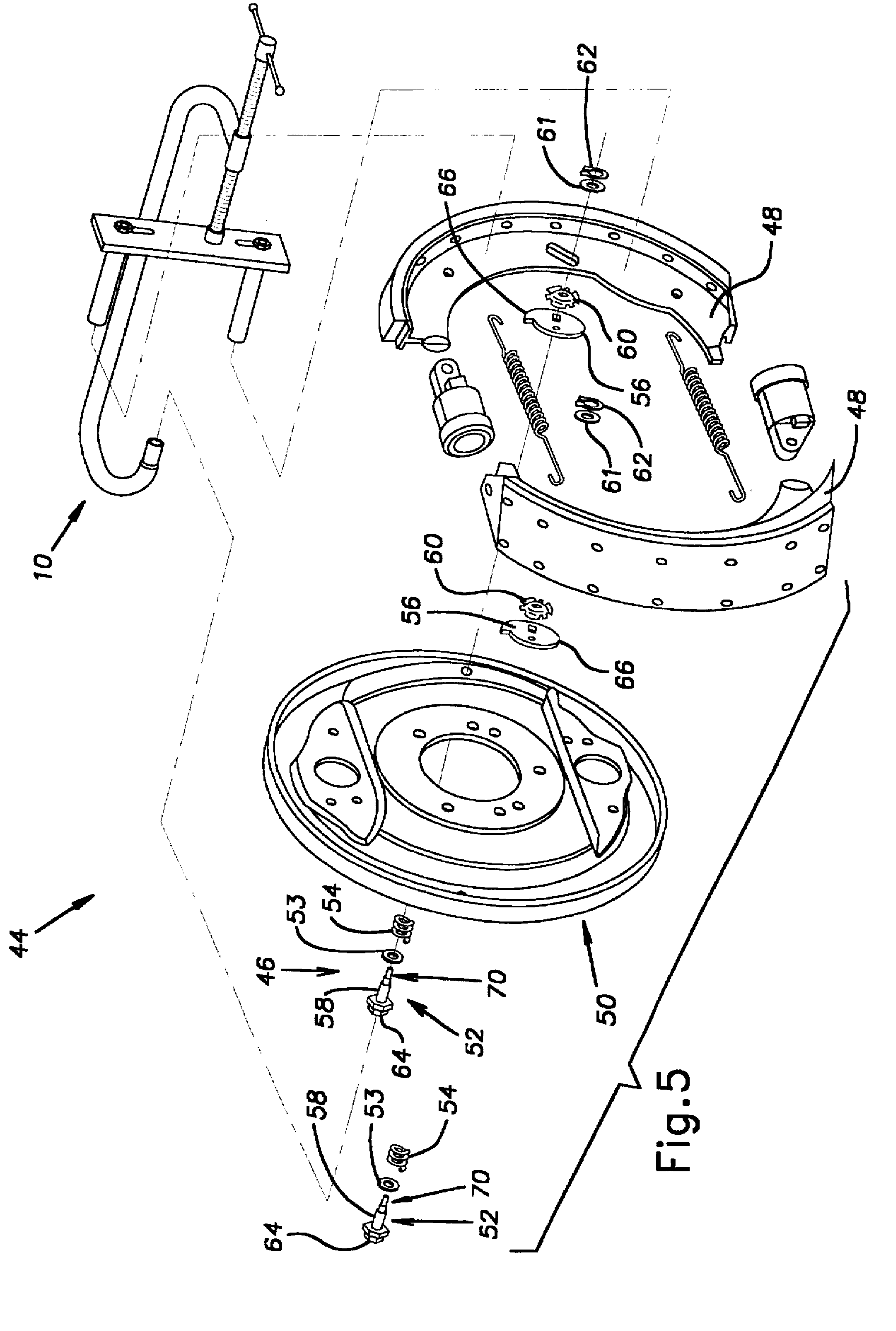
FIG. 5 is an exploded perspective view of a brake system incorporating a manual brake shoe adjustment system on which the tool of FIGS. 1–4 is used; and, FIG. 6 is a cross-sectional view showing the tool of FIGS. 1–4 in conjunction with the braking system shown in FIG. 5.
Figure 6:
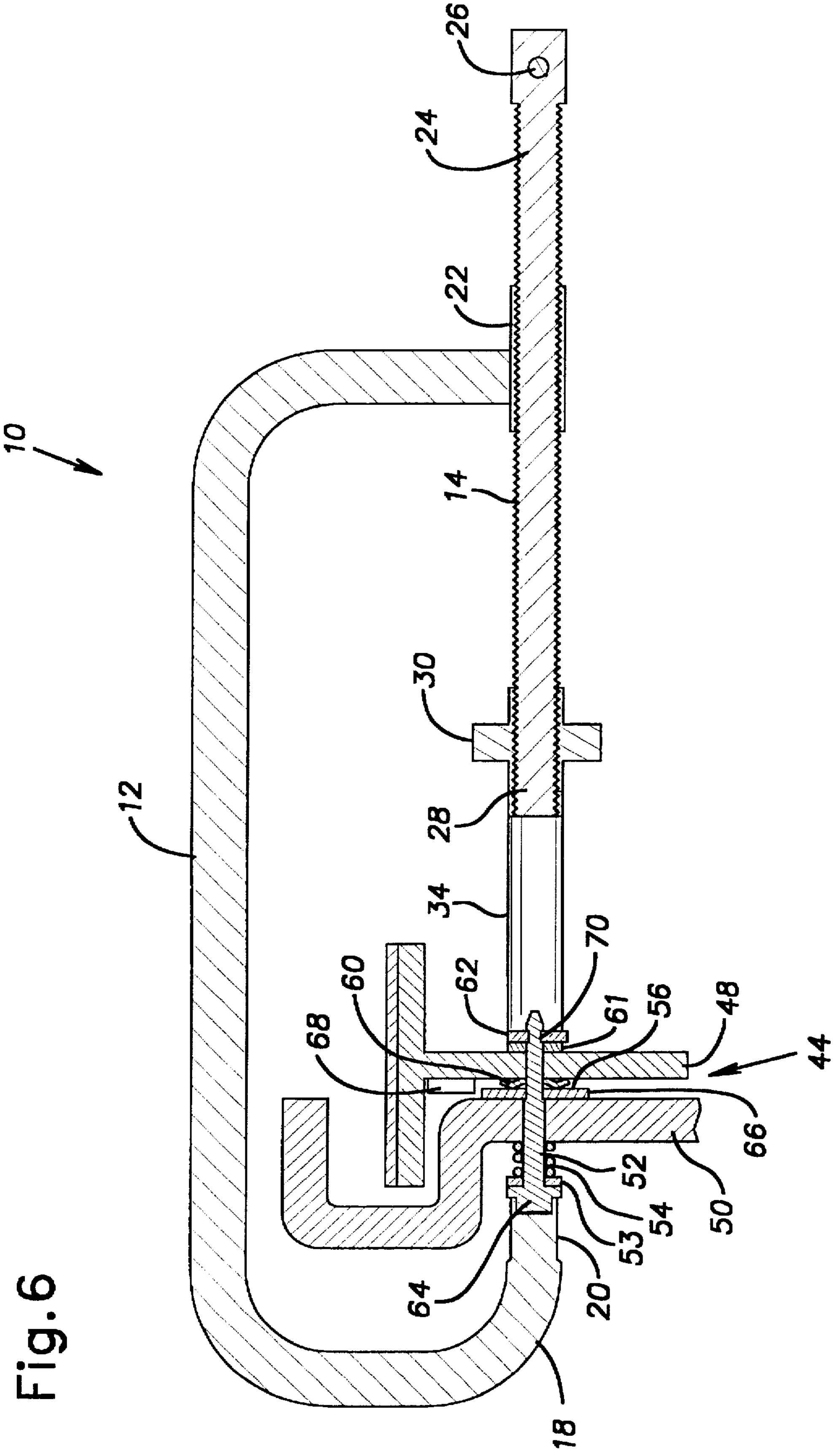

With reference to FIGS. 5 and 6, a brake assembly 44 on which the tool 10 previously described and shown in FIGS. 1–4 is used. Initially, it is noted that a method of using the spring compression tool according to the present invention is described hereafter as it relates to a WAGNER front brake having manual or automatic brake shoe adjustment systems, it being understood that the present invention will have equal functionality on other brakes which include manual or automatic shoe adjustment systems, and in other circumstances wherein similar problems (i.e., compression of a spring) are present.

The illustrated brake assembly 44 is a well-known WAGNER front brake (i.e., 15"×3"; 15"×3.5"), and incorporates a manual brake shoe adjustment system 46, a pair of brake shoes 48, and a backing plate 50. The manual brake shoe adjustment system 46 includes a headed adjustment stud 52, a compression spring 54, an eccentric 56, a series of washers 53, 60, 61, and a spring clip 62.

When the manual brake shoe adjustment system 46 is mounted on the brake shoe 48 and the backing plate 50, a head 64 of the adjustment stud 52 is located on one side of the backing plate 50, and a shaft 58 of the adjustment stud extends through an opening in the backing plate 50 and through an aligned slot in the brake shoe 48. The slot in the brake shoe 48 is generally elongated, and illustrates a direction of adjustment or movement of the brake shoe 48 due to rotation of the eccentric 56, to be described hereafter. The washer 53 is disposed over the stud shaft 58 and adjacent the stud head 64. The compression spring 54 is received and compressed between the stud head 64 and the backing plate 50.

The eccentric 56 is disposed relatively between the backing plate 50 and the brake shoe 48 and is disposed over the stud shaft 58. The eccentric 56 has an arcuate peripheral/radial surface 66 in engagement with a flange or projection 68 extending from the brake shoe 48 toward the backing plate 50. In this regard, the stud shaft 58 has a rectangular portion, in cross-section, which is received in a similarly shaped opening in the eccentric 56 to attach the eccentric and stud for mutual rotation. The washer 60 is disposed over the stud shaft 58 and relatively between the eccentric 56 and the brake shoe 48. The washer 61 is disposed over the stud shaft 58 and adjacent the brake shoe 48. The spring clip 62 is received within a groove 70 at an outer end of the stud shaft 58 and is located on a side of the brake shoe 48 opposite or remote from the backing plate 50 and outwardly adjacent the washer 61.

Turning the stud 52 rotates the eccentric 56 and alters the portion of the eccentric's radial surface 66 in contact with the brake shoe flange 68 to cause radial movement of the brake shoe 48 in a direction defined generally by the brake shoe slot, as is well-known in art.

During use of the manual adjustment system 46 described above, the compression spring 54 is necessary to maintain the brake shoe 48 in an adjusted position. More specifically, tension on the stud 52 and the eccentric 56 (provided by the spring 54) prevents the eccentric 56 and stud 52 from rotating away from the adjusted position when the brake assembly 44 is used (i.e., when the brake linings carried by the brake shoes 48 are applied against a surrounding brake drum (not shown)).

However, compression of the spring 54 during assembly has been problematic, as noted hereinbefore. As such, it has become quite common for mechanics, prior to the present invention, to avoid replacing the manual or automatic shoe adjustment systems as is desirable and recommended. The tool 10 according to the present invention makes compression of the spring 52 and resulting assembly of the manual adjustment system 46 easier and quicker for the mechanic and, hopefully, will make the mechanic more willing to replace the shoe adjustment systems 46.

A method of using the tool 10 according to the present invention will be described hereafter with reference to the foregoing description and drawings. With the brake shoes 48 attached to the backing plate 50, the compression spring 54 is positioned adjacent the adjustment stud head 64 and the adjustment stud shaft 58 is inserted through the opening in the backing plate 50. The eccentric 56 is mounted over the stud shaft 58 and relatively between the backing plate 50 and the associated brake shoe 48. The stud shaft. 58 projects partially through the elongated slot in the brake shoe, but not sufficiently to permit mounting of the washers 60 and spring clip 62 on the shaft.

The first clamping member 20 of the tool 10 is placed over or around the head 64 of the adjustment stud 52 such that the head 52 is received within the recess in the first clamping member 20, and the second and third clamping members 32, 34 are placed into engagement with the side of the brake shoe 48 opposite the backing plate 50. The spacing between the second and third clamping members 32, 34 can be adjusted., via manipulation of the bolt 42 within the slot 40, to accommodate various brake shoe sizes. Thereafter, the handle member 26 is turned to move the shaft 14 and, therefore, the beam member 16 and the second and third clamping members 32, 34, toward the associated brake shoe 48.

Further rotation of the handle member 26 urges the stud head 64 toward the backing plate 50, compresses the spring 54, and forces the stud shaft 58 further through the brake shoe 48. When the spring 54 is sufficiently compressed, the mechanic may release the tool 10 and have both hands free to place the washer 61 over the exposed end of the stud shaft 58, and insert the spring clip 62 into the retaining groove 70 in the stud shaft 58.

Thereafter, the tool 10 can be removed from the brake assembly by turning the handle member 26 in an opposite direction to thereby partially release compression from the spring 54, free the second and third clamping members 32, 34 from the brake shoe 48, and free the first clamping member 20 from the stud head 64.

At this point, the radial surface 66 of the eccentric 56 is in engagement with the brake shoe flange 68. The position of the brake shoe 48 relative to the surrounding brake drum can be adjusted simply by rotation of the stud 52, which causes rotation of the eccentric 56, and radial movement of the brake shoe 48. The brake shoe 48 is retained in the adjusted position by operation of the compression spring 54.

While the preferred embodiment of the present invention has been disclosed in the foregoing, various modifications, improvements and replacements of the parts are contemplated without departing from the scope of the present invention. For example, a tool and assembly method according to the present invention is equally functional in automatic brake shoe adjustment systems, as noted previously herein. Moreover, it is contemplated that the tool according to the present invention could be modified such that the second and third clamping members are slid into engagement with the brake shoe, and the handle subsequently turned. Such modification would reduce the number of turns required to adequately compress the spring and thereby further speed assembly of the manual brake shoe adjustment system.

What is claimed is:

1. A spring compression tool, comprising a body member and an adjustable portion, said body member having a first end and a second end, said first end comprising a first clamping member, said first clamping member defining a recess which is adapted to receive a head of an adjustment stud, said adjustable portion comprising a shaft, a plate, and second and third clamping members, said shaft having a first end and a second end and being movably secured to the second end of the body member, said plate having a first end and a second end, said shaft first end being affixed to said plate at a location closer to said plate second end than to said plate first end, said second and third clamping members being secured to said plate, outer surfaces of said second and third clamping members cooperate to define a plane generally parallel to said plate member, said second and third clamping members being movable relatively toward and away from said first clamping member.

2. A spring compression tool according to claim 1, wherein said body member is generally C-shaped.

3. A spring compression tool according to claim 1, wherein said shaft has a threaded outer surface which is threadably received by said second end of said body member.

4. A spring compression tool according to claim 3, wherein said shaft second end has a handle member secured thereto.

5. A spring compression tool according to claim 4, wherein said second clamping member is adjustably secured to said plate adjacent said plate first end and said third clamping member is adjustably secured to said plate adjacent said plate second end.

6. A spring compression tool according to claim 5, wherein said second and third clamping members are parallel to said first clamping member.

7. A spring compression tool according to claim 5, wherein a spacing between said second and third clamping members can be adjusted.

8. A spring compression tool comprising a body member and an adjustable portion, said body member having a first end and a second end, said first end comprising a first clamping member, said first clamping member defining a recess which is adapted to receive a head of an adjustment stud, said adjustable portion comprising a shaft, a plate, and second and third clamping members, said shaft having a first end and a second end and being movably secured to the second end of the body member, said plate having a first end and a second end, said shaft first end being rigidly affixed to said plate at a location closer to said plate second end than to said plate first end, said second clamping member being secured to said plate adjacent said plate first end and said third clamping member being secured to said plate adjacent said plate second end, said second and third clamping members being elongated in shape and extending away from said plate generally parallel to one another and toward said first clamping member, outer surfaces of said second and third clamping members cooperate to define a plane generally parallel to said plate member, said second and third clamping members being movable relatively toward and away from said first clamping member by rotation of said threaded shaft.

9. A spring compression tool according to claim 8, wherein each of said second and third clamping members comprise a cylindrical body.

10. A spring compression tool according to claim 9, wherein said plate defines a pair of slots, and each of said second and third clamping members comprise a bolt, said bolts being slidably received in an associated one of said slots and threadably received in an associated one of said cylindrical body.

11. A spring compression tool according to claim 10, wherein said plane defined by said outer surfaces of said second and third clamping members is perpendicular to a length direction of said second and third clamping members.

* * * * *